(12) United States Patent
Asai (10) Patent No.: US 11,038,548 B2
(45) Date of Patent: Jun. 15, 2021

(54) WIRELESS COMMUNICATION APPARATUS, WIRELESS COMMUNICATION SYSTEM, AND COMMUNICATION METHOD

(71) Applicant: CANON KABUSHIKI KAISHA, Tokyo (JP)

(72) Inventor: Hitoshi Asai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/844,474

(22) Filed: Apr. 9, 2020

(65) Prior Publication Data

US 2020/0328775 A1 Oct. 15, 2020

(30) Foreign Application Priority Data

Apr. 15, 2019 (JP) .............................. JP2019-077096

(51) Int. Cl.
| | |
|---|---|
| *H04B 1/56* | (2006.01) |
| *H01Q 19/24* | (2006.01) |
| *H04L 5/14* | (2006.01) |
| *H01Q 21/12* | (2006.01) |
| *H01Q 19/30* | (2006.01) |

(52) U.S. Cl.
CPC .............. *H04B 1/56* (2013.01); *H01Q 19/24* (2013.01); *H01Q 19/30* (2013.01); *H01Q 21/12* (2013.01); *H04L 5/14* (2013.01)

(58) Field of Classification Search
None
See application file for complete search history.

(56) References Cited

U.S. PATENT DOCUMENTS

| | | | | | |
|---|---|---|---|---|---|
| 2,855,537 | A | * | 10/1958 | Mendel Johnt | ..... H01J 23/0873 315/3.6 |
| 3,208,342 | A | * | 9/1965 | Nethercot, Jr. | ........ G02F 1/3131 385/40 |
| 3,349,365 | A | * | 10/1967 | Dozier | ................. H01R 4/4872 439/729 |
| 5,964,478 | A | * | 10/1999 | Stanley | ............. B60R 21/01566 280/735 |
| 6,661,637 | B2 | * | 12/2003 | McIntosh | ............. G01D 5/2417 361/207 |
| 6,956,450 | B1 | * | 10/2005 | Lohr | ....................... H01F 38/14 333/24 R |

(Continued)

FOREIGN PATENT DOCUMENTS

| | | | | |
|---|---|---|---|---|
| EP | 3349365 A1 | * | 7/2018 | ........... H04B 7/0865 |
| JP | 64-5235 A | | 1/1989 | |

(Continued)

*Primary Examiner* — Berhanu Tadese
(74) *Attorney, Agent, or Firm* — Canon U.S.A., Inc. I.P. Division (57) ABSTRACT

A wireless communication module includes a first conductor and a second conductor that function as an electrode for wireless communication of a differential signal using electric field coupling, a third conductor and a fourth conductor that function as an electrode for wireless communication using electric field coupling. A straight line that connects the centroid of the first conductor and the centroid of the second conductor is not parallel to a straight line that connects the centroid of the third conductor and the centroid of the fourth conductor.

16 Claims, 7 Drawing Sheets

(56) References Cited

U.S. PATENT DOCUMENTS

| | | | | |
|---|---|---|---|---|
| 8,749,496 B2* | 6/2014 | Chang | G02F 1/13338 | 345/173 |
| 8,866,787 B2* | 10/2014 | Chang | G06F 3/0412 | 345/173 |
| 9,276,553 B2* | 3/2016 | Suzuki | H02J 5/005 | |
| 9,331,663 B2* | 5/2016 | Suzuki | H04B 5/0037 | |
| 9,337,798 B2* | 5/2016 | Suzuki | H02J 50/10 | |
| 9,459,746 B2* | 10/2016 | Rosenberg | G06F 3/0442 | |
| 9,746,964 B2* | 8/2017 | Rosenberg | G06F 3/0446 | |
| 9,864,143 B2* | 1/2018 | Kuroda | H04L 25/0278 | |
| 10,073,565 B2* | 9/2018 | Rosenberg | G06F 3/0442 | |
| 10,291,290 B2* | 5/2019 | Kuroda | H04B 5/0012 | |
| 10,348,365 B2* | 7/2019 | Kuroda | H04B 5/0018 | |
| 10,534,478 B2* | 1/2020 | Rosenberg | G06F 3/0446 | |
| 10,608,478 B2* | 3/2020 | Yamakawa | H02J 7/025 | |
| 10,630,390 B2* | 4/2020 | Ide | B25J 9/042 | |
| 10,735,050 B2* | 8/2020 | Yukimasa | H04B 5/0012 | |
| 2002/0033048 A1* | 3/2002 | McIntosh | G01L 11/008 | 73/514.32 |
| 2003/0233288 A1* | 12/2003 | Sweeney | G06Q 30/06 | 705/28 |
| 2007/0096446 A1* | 5/2007 | Breed | B60R 21/239 | 280/735 |
| 2007/0132220 A1* | 6/2007 | Breed | B60R 21/0152 | 280/735 |
| 2010/0144391 A1* | 6/2010 | Chang | G02F 1/13338 | 455/566 |
| 2010/0309901 A1* | 12/2010 | Beghini | H04B 1/0057 | 370/343 |
| 2011/0057899 A1* | 3/2011 | Sleeman | G06F 3/0445 | 345/174 |
| 2013/0307637 A1* | 11/2013 | Takemura | H03H 9/725 | 333/133 |
| 2014/0175896 A1* | 6/2014 | Suzuki | H02J 50/80 | 307/104 |
| 2014/0191819 A1* | 7/2014 | Suzuki | H02J 7/025 | 333/17.3 |
| 2014/0240286 A1* | 8/2014 | Chang | G06F 3/04164 | 345/174 |
| 2014/0355935 A1* | 12/2014 | Kuroda | H04L 25/0266 | 385/42 |
| 2015/0077385 A1* | 3/2015 | Zhou | G06F 3/0416 | 345/174 |
| 2015/0091859 A1* | 4/2015 | Rosenberg | G06F 3/0445 | 345/174 |
| 2015/0207541 A1* | 7/2015 | Kuroda | H04B 5/0093 | 455/41.1 |
| 2015/0229137 A1* | 8/2015 | Suzuki | H02J 50/12 | 333/17.3 |
| 2015/0229289 A1* | 8/2015 | Suzuki | H02J 7/025 | 333/17.3 |
| 2016/0170516 A1* | 6/2016 | Crandall | G06F 3/04162 | 345/174 |
| 2016/0285514 A1* | 9/2016 | Chen | G06F 3/0446 | |
| 2017/0075496 A1* | 3/2017 | Rosenberg | G06F 3/04166 | |
| 2017/0106759 A1* | 4/2017 | Yamakawa | H02J 50/12 | |
| 2017/0322674 A1* | 11/2017 | Rosenberg | G06F 3/041661 | |
| 2018/0076853 A1* | 3/2018 | Kuroda | H05K 1/0243 | |
| 2019/0018544 A1* | 1/2019 | Rosenberg | G06F 3/0441 | |
| 2019/0097731 A1* | 3/2019 | Ide | H04B 10/671 | |
| 2019/0221507 A1* | 7/2019 | Kimura | H05K 1/0271 | |
| 2019/0245585 A1* | 8/2019 | Morita | H04B 5/0081 | |
| 2020/0110506 A1* | 4/2020 | Rosenberg | G06F 3/04162 | |
| 2020/0127703 A1* | 4/2020 | Yukimasa | H04B 5/0031 | |
| 2020/0203823 A1* | 6/2020 | Shoji | H04B 5/0037 | |

FOREIGN PATENT DOCUMENTS

| | | | | |
|---|---|---|---|---|
| JP | 2012085234 A | * | 4/2012 | H04B 7/0865 |
| JP | 2016-29785 A | | 3/2016 | |
| JP | 2019176697 A | * | 10/2019 | H04B 7/0865 |

* cited by examiner

WIRELESS COMMUNICATION APPARATUS, WIRELESS COMMUNICATION SYSTEM, AND COMMUNICATION METHOD

BACKGROUND

Field

The present disclosure relates to a wireless communication apparatus and a wireless communication system.

Description of the Related Art

A physical connector or a harness can be used to connect a communication interface between electronic circuit substrates or modules. However, it can be difficult for a robot or other automated system to automatically connect such connectors or harnesses and thus installing the connections often requires manual human work. Further, the use of connectors for establishing connection between devices can impose physical constraints of arrangement or can require a special mechanism such as a cover to conform to a waterproof standard. To solve these problems, Japanese Patent Laid-Open No. 64-5235 and Japanese Patent Laid-Open No. 2016-29785 disclose a wireless communication system for non-contact data transmission using electric field coupling.

According to Japanese Patent Laid-Open No. 64-5235 and Japanese Patent Laid-Open No. 2016-29785, a coupler of a transmitter and a coupler of a receiver are arranged to be close to one another such that they can achieve wireless communication with one another using electric field coupling. A set which includes the coupler of the transmitter and the coupler of the receiver are referred to below as a coupler pair.

Two or more coupler pairs are needed for wireless full-duplex two-way communication or multi-lane (multi-system) communication. However, where the coupler pairs are arranged to be close to one another, electric field coupling can occur between the coupler pairs. Such electric field coupling can result in communication interference and can cause problems such as communication errors and communication failure. In order to inhibit such communication interference, a large space is needed to separate the coupler pairs from each other. This factor can greatly restrict the range of structures and designs of a small device, particularly in a case where coupler pairs are installed in the small device.

SUMMARY

Various embodiments of the present disclosure provide a wireless communication apparatus that includes a first conductor and a second conductor that function as a set of electrodes for wireless communication of a differential signal using electric field coupling, between the wireless communication apparatus and another wireless communication apparatus, and a third conductor and a fourth conductor that function as another set of electrodes for wireless communication using electric field coupling, between the wireless communication apparatus and the other wireless communication apparatus. A difference between a first distance between a centroid of the first conductor and a centroid of the third conductor, and a second distance between a centroid of the second conductor and the centroid of the third conductor, is less than a width of the first conductor and a width of the second conductor. A third distance between the centroid of the first conductor and a centroid of the fourth conductor is longer than the first distance. A fourth distance between the centroid of the second conductor and the centroid of the fourth conductor is longer than the second distance.

Further features will become apparent from the following description of various embodiments of the present disclosure with reference to the attached drawings.

DESCRIPTION OF THE EMBODIMENTS

Figure 1:
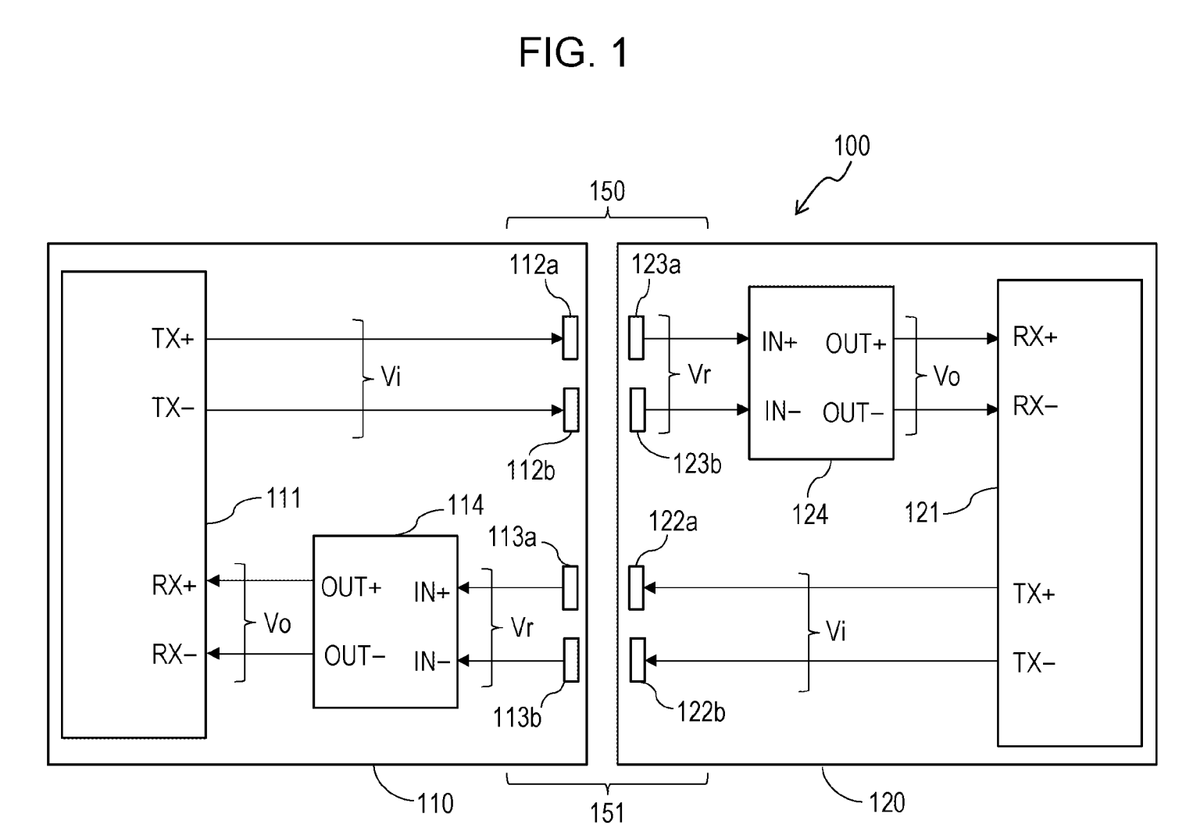
FIG. 1 is a block diagram of an example of the structure of a wireless communication system according to one embodiment.

FIG. 1 is a block diagram showing an example of a structure of a wireless communication system 100 according to one embodiment of the present disclosure. The wireless communication system 100 includes wireless communication modules 110 and 120 and enables wireless full-duplex communication between the wireless communication modules 110 and 120. In the full-duplex communication, the wireless communication modules 110 and 120 can perform transmission and reception at the same time.

The wireless communication module 110 is a wireless communication apparatus and includes a transceiver circuit 111, couplers 112a, 112b, 113a, and 113b, and a transformation circuit 114. The wireless communication module 120 is a wireless communication apparatus and includes a transceiver circuit 121, couplers 122a, 122b, 123a, and 123b, and a transformation circuit 124.

A coupler pair 150 corresponds to pairs of the couplers 112a and 112b of wireless communication module 110, and the couplers 123a and 123b of wireless communication module 110, to be used for transmission from the wireless communication module 110 to the wireless communication module 120. The couplers 112a and 112b and the couplers 123a and 123b are conductors that function as electrodes for wireless communication using electric field coupling. The coupler 112a of wireless communication module 110 and the coupler 123a of wireless communication module 120 are close to each other, face each other, and wirelessly communicate a signal output by a transmission terminal TX+ of the transceiver circuit 111 of wireless communication module 110 using electric field coupling. The coupler 112b of wireless communication module 110 and the coupler 123b of wireless communication module 120 are close to each other, face each other, and wirelessly communicate a signal output by a transmission terminal TX− of the transceiver circuit 111 of wireless communication module 110 using electric field coupling.

A coupler pair 151 corresponds to pairs of the couplers 122a and 122b of wireless communication module 120, and the couplers 113a and 113b of wireless communication module 110, for transmission from the wireless communication module 120 to the wireless communication module 110. The couplers 122a, 122b, 113a, and 113b are conductors that function as electrodes for wireless communication using electric field coupling. The coupler 122a of wireless communication module 120, and the coupler 113a of wireless communication module 110, are close to each other, face each other, and wirelessly communicate a signal output by a transmission terminal TX+ of the transceiver circuit 121 of wireless communication module 120 using electric field coupling. The coupler 122b of wireless communication module 120 and the coupler 113b of wireless communication module 110 are close to each other, face each other, and wirelessly communicate a signal output by a transmission terminal TX− of the transceiver circuit 121 of wireless communication module 120 using electric field coupling. Each coupler is composed of a metal plate or a copper pattern such as a rigid substrate or a flexible substrate. According to the present embodiment, the coupler 112a, the coupler 112b, the coupler 113a, and the coupler 113b of wireless communication module 110 are disposed on the same substrate, and the coupler 122a, the coupler 122b, the coupler 123a, and the coupler 123b of wireless communication module 110 are disposed on the same substrate. However, in other embodiments, the couplers may be disposed differently. For example, in other embodiments, the coupler 112a and the coupler 112b may be disposed on different substrates and the coupler 113a and the coupler 113b may be disposed on different substrates.

The transceiver circuit 111 of wireless communication module 110 outputs differential transmission signals to the couplers 112a and 112b of wireless communication module 110 via the transmission terminals TX+ and TX−. The signal output by the transmission terminal TX+ and the signal output by the transmission terminal TX− are input signals Vi and are binary differential signals that have reversed phases. The coupler 112a wirelessly transmits the signal output by the transmission terminal TX+ of the transceiver circuit 111 of wireless communication module 110 using electric field coupling to the coupler 123a of wireless communication module 120 on the outside therefrom. The coupler 112b of wireless communication module 110 wirelessly transmits the signal output by the transmission terminal TX− of the transceiver circuit 111 of wireless communication module 110 using electric field coupling to the coupler 123b of wireless communication module 120 on the outside therefrom. The coupler 112a and the coupler 112b of wireless communication module 110 wirelessly transmit the differential signals output by the transmission terminals TX+ and TX− of the transceiver circuit 111 of wireless communication module 110 to the coupler 123a and the coupler 123b of wireless communication module 120 on the outside therefrom.

The coupler 123a wirelessly receives the signal using electric field coupling from the coupler 112a on the outside therefrom. The coupler 123b wirelessly receives the signal using electric field coupling from the coupler 112b on the outside therefrom. The coupler 123a and the coupler 123b wirelessly receive the differential signals from the coupler 112a and the coupler 112b on the outside therefrom.

The signal transmitted by the coupler 123a and the signal transmitted by the coupler 123b are reception signals Yr. The transformation circuit 124 inputs the signal transmitted by the coupler 123a into an input terminal IN+, inputs the signal transmitted by the coupler 123b into an input terminal IN−, and outputs differential signals via output terminals OUT+ and OUT−. The signal outputted by the output terminal OUT+ and the signal outputted by the output terminal OUT− are output signals Vo and are binary differential signals that have reversed phases. The transformation circuit 124 shapes the waveform of the reception signals Vr and restores binary output signals Vo. The output signals Vo correspond to the input signals Vi that are outputted from the transceiver circuit 111. The transceiver circuit 121 inputs the signals of the output terminals OUT+ and OUT− of the transformation circuit 124 into reception terminals RX+ and RX− for a reception process.

Similarly, the transceiver circuit 121 outputs differential transmission signals to the couplers 122a and 122b via the transmission terminals TX+ and TX−. The signal outputted by the transmission terminal TX+ and the signal outputted by the transmission terminal TX− are input signals Vi and are binary differential signals that have reversed phases. The coupler 122a wirelessly transmits the signal output by the transmission terminal TX+ of the transceiver circuit 121 using electric field coupling to the coupler 113a on the outside therefrom in communication module 110. The coupler 122b wirelessly transmits the signal output by the transmission terminal TX− of the transceiver circuit 121 using electric field coupling to the coupler 113b on the outside therefrom in communication module 110. The coupler 122a and the coupler 122b wirelessly transmit the differential signals of the transmission terminals TX+ and TX− of the transceiver circuit 121 to the coupler 113a and the coupler 113b on the outside therefrom in communication module 110.

The coupler 113a wirelessly receives the signal transmitted using electric field coupling from the coupler 122a on the outside therefrom. The coupler 113b wirelessly receives the signal using electric field coupling from the coupler 122b on the outside therefrom. The coupler 113a and the coupler 113b wirelessly receive the differential signals from the coupler 122a and the coupler 122b on the outside therefrom in communication module 120.

The signal transmitted by the coupler 113a and the signal transmitted by the coupler 113b are reception signals Vr. The transformation circuit 114 of inputs the signal transmitted by the coupler 113a into an input terminal IN+, inputs the signal transmitted by the coupler 113b into an input terminal IN−, and outputs differential signals via output terminals OUT+ and OUT−. The signal output by the output terminal OUT+ and the signal output by the output terminal OUT− are output signals Vo and are binary differential signals that have reversed phases. The transformation circuit 114 shapes the waveform of the reception signals Vr and restores binary output signals Vo. The output signals Vo correspond to the input signals Vi that are outputted from the transceiver circuit 121. The transceiver circuit 111 inputs the signals of the output terminals OUT+ and OUT− of the transformation circuit 114 into reception terminals RX+ and RX− for a reception process.

Figure 2:
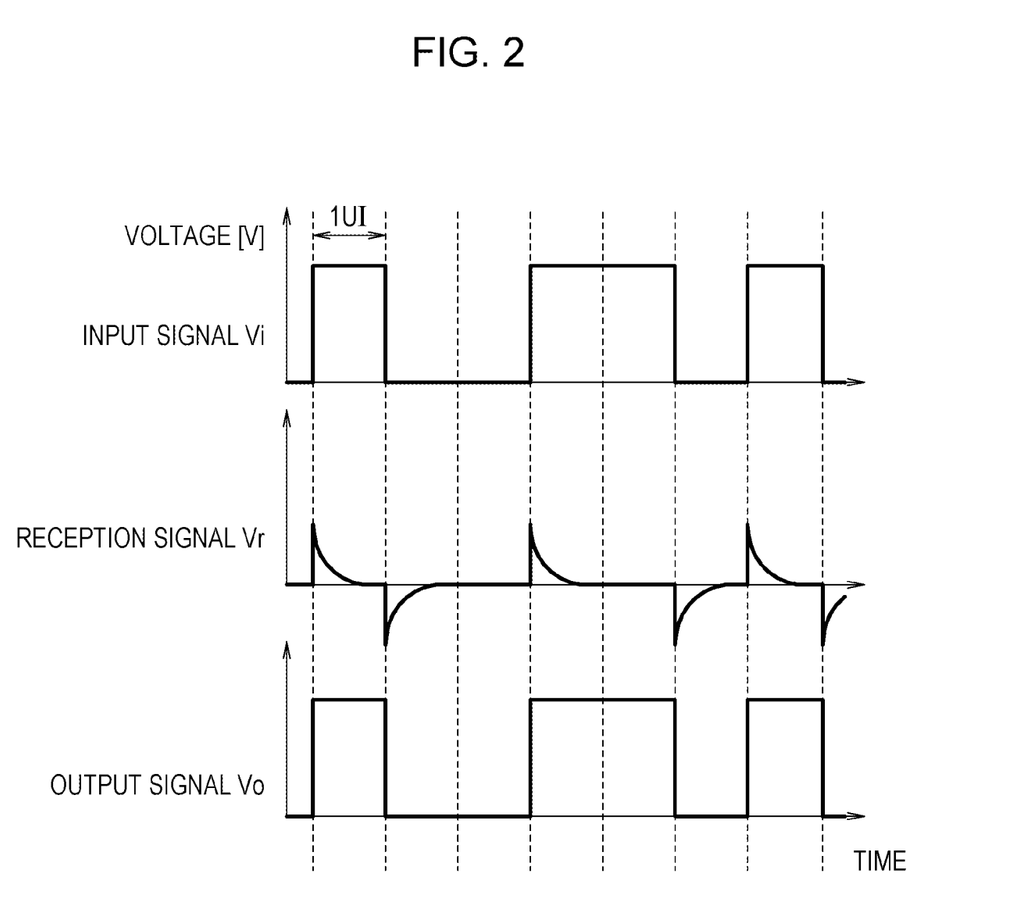
FIG. 2 is a timing chart for a description of an electrical signal to be communicated according to one embodiment.

FIG. 2 is a timing chart illustrating an example of each input signal Vi, each reception signal Vr, and each output signal Vo in FIG. 1. In FIG. 2, the input signal Vi represents the signal output by the terminal TX+, the reception signal Vr represents the signal output by the terminal IN+, and the output signal Vo represents the signal output by the reception terminal RX+. The same is true for the input signal Vi of the terminal TX−, the reception signal Vr of the terminal IN−, and the output signal Vo of the reception terminal RX−.

The input signal Vi and the output signal Vo are binary digital signals. One unit interval (UI) represents the length of a bit in a bitstream of a digital signal. The reception signal Vr is an analog signal.

The following description includes by way of example the input signal Vi, the reception signal Vr, and the output signal Vo in the case of transmission from the wireless communication module 110 to the wireless communication module 120. The same is true for the input signal Vi, the reception signal Vr, and the output signal Vo in the case of transmission from the wireless communication module 120 to the wireless communication module 110.

The input signals Vi are inputted from the transceiver circuit 111 into the couplers 112a and 112b. The reception signals Vr are inputted from the couplers 123a and 123b into the transformation circuit 124. The output signals Vo are inputted from the transformation circuit 124 to the transceiver circuit 121.

The transceiver circuit 111 outputs binary digital signals that represent "1" or "0" as the input signals Vi to the couplers 112a and 112b. The coupler 112a and the coupler 123a between which electric field coupling occurs have transmission characteristics similar to those of a high-pass filter (HPF) in which coupling is weak in a low band and coupling is strong in a high band. Accordingly, only a high-frequency component of the input signal Vi is transmitted from the coupler 112a to the coupler 123b, and the coupler 123b receives the reception signal Vr. As illustrated in FIG. 2, the reception signal Vr ideally has a waveform obtained by inexact differential of the input signal Vi. The same is true for the couplers 112b, 123b, 113a, 122a, 113b, and 122b as in the couplers 112a and 123a.

The transformation circuit 124 shapes the reception signals Vr, restores the binary input signals Vi that are outputted from the transceiver circuit 111 and that represent "1" or "0", and outputs the output signals Vo. For example, the transformation circuit 124 is embodied by a hysteresis comparator. The hysteresis comparator compares the result of subtracting the signal received at the input terminal IN− from the signal received at the input terminal IN+ and a threshold and outputs the output signals Vo. The same is true for the transformation circuit 114 as in the transformation circuit 124. The wireless communication module 110 and the wireless communication module 120 can thus achieve noncontact wireless communication with each other using electric field coupling.

Figure 3A:
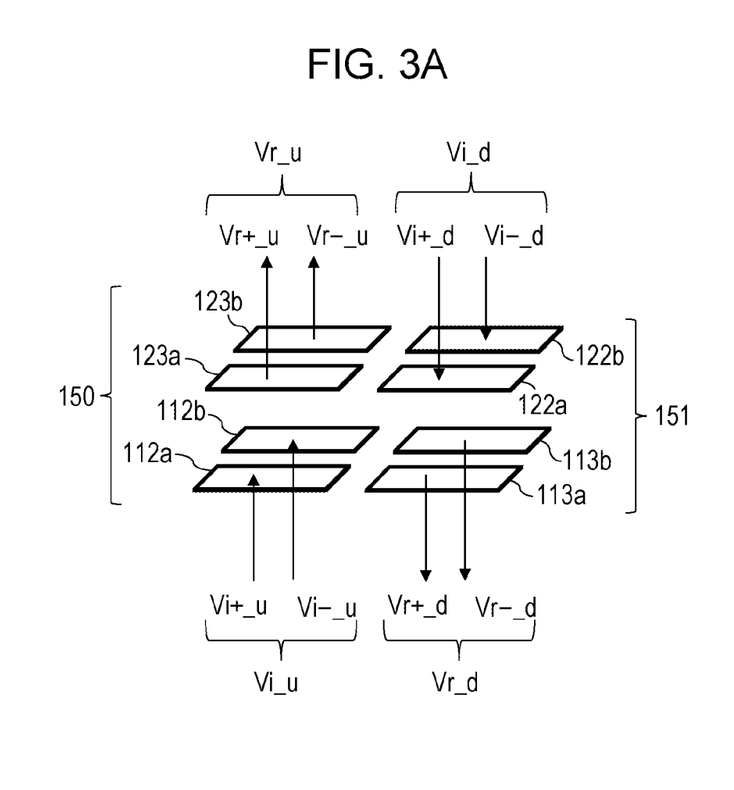
FIG. 3A and FIG. 3B illustrate a problem of coupler arrangement.
Figure 3B:
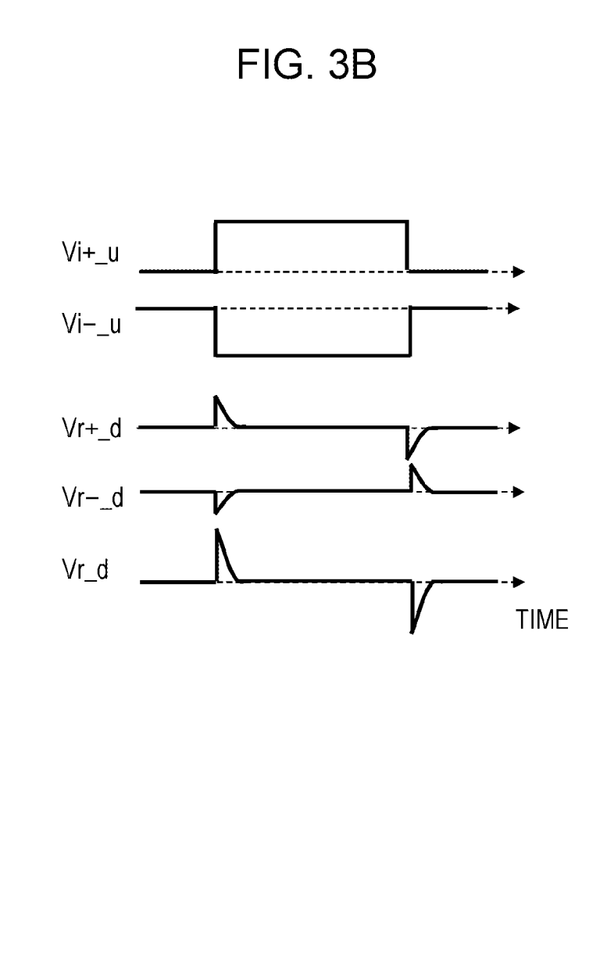

FIG. 3A and FIG. 3B illustrate an example of an arrangement of the couplers 112a, 112b, 113a, 113b, 122a, 122b, 123a, and 123b. Interference that occurs due to the arrangement of the couplers will be described with reference to FIG. 3A and FIG. 3B. FIG. 3A illustrates the arrangement of the couplers 112a, 112b, 113a, 113b, 122a, 122b, 123a, and 123b. FIG. 3B illustrates the waveform of a signal to describe the communication interference that occurs in the case of the arrangement of the couplers in FIG. 3A.

The transmission terminal TX+ of the transceiver circuit 111 outputs an input signal Vi+_u to the coupler 112a. The transmission terminal TX− of the transceiver circuit 111 outputs an input signal Vi−_u to the coupler 112b. An input signal Vi_u is a signal of (Vi+_u)-(Vi−_u).

The coupler 123a outputs a reception signal Vr+_u to the input terminal IN+ of the transformation circuit 124. The coupler 123b outputs a reception signal Vr−_u to the input terminal IN− of the transformation circuit 124. A reception signal Vr_u is a signal of (Vr+_u)-(Vr−_u).

The transmission terminal TX+ of the transceiver circuit 121 outputs an input signal Vi+_d to the coupler 122a. The transmission terminal TX− of the transceiver circuit 121 outputs an input signal Vi−_d to the coupler 122b. An input signal Vi_d is a signal of (Vi+_d)-(Vi−_d).

The coupler 113a outputs a reception signal Vr+_d to the input terminal IN+ of the transformation circuit 114. The coupler 113b outputs a reception signal Vr−_d to the input terminal IN− of the transformation circuit 114. A reception signal Vr_d is a signal of (Vr+_d)-(Vr−_d).

The couplers 112a, 112b, 113a, 113b, 122a, 122b, 123a, and 123b are rectangular conductors, and the longitudinal directions thereof are parallel to each other. The coupler pairs 150 and 151 are arranged to be close to each other.

As illustrated in FIG. 3B, the input signals Vi+_u and Vi−_u are differential signals the level of which changes. In the following description, the level of the input signals Vi+_d and Vi−_d does not change for simplicity of the description.

Since the level of the input signals Vi+_d and Vi−_d does not change, the level of the reception signals Vr+_d and Vr−_d ideally does not change.

However, since the coupler 113a is arranged to be close to the coupler 112a, electric field coupling between the couplers 113a and 112a is dominant Consequently, as illustrated in FIG. 3B, the coupler 113a receives the reception signal Vr+_d that has an edge extending upward and obtained by inexact differential of the input signal Vi+_u of the coupler 112a using electric field coupling to the coupler 112a.

Similarly, since the coupler 113b is arranged to be close to the coupler 112b, electric field coupling between the couplers 113b and 112b is dominant Consequently, as illustrated in FIG. 3B, the coupler 113b receives the reception signal Vr−_d that has an edge extending upward and obtained by inexact differential of the input signal Vi−_u of the coupler 112b using electric field coupling to the coupler 112b.

As illustrated in FIG. 3B, the reception signal Vr_d is a signal of (Vr+_d)-(Vr−_d) and has a large noise waveform. The waveform of the reception signal Vr_d is an interference waveform (noise) and causes a communication error or communication inability.

The transformation circuit 114 compares the reception signal Vr_d obtained by subtracting the reception signal Vr−_d from the reception signal Vr+_d and a threshold and outputs the output signals Vo. The transformation circuit 114 outputs mistaken binary output signals Vo because the reception signal Vr_d of the noise is larger than the threshold, and the level of the output signals Vo changes. This results in a communication error.

The couplers 112a, 112b, 113a, and 113b are described above. The same communication interference occurs in the couplers 122a, 122b, 123a, and 123b. When the coupler pair 150 and the coupler pair 151 are thus close to each other, and electric field coupling occurs between the coupler pair 150 and the coupler pair 151, a noise is made, and this causes the communication error. However, a large space is needed to separate the coupler pair 150 and the coupler pair 151 from each other, and the size of the wireless communication modules 110 and 120 increases, which is a demerit.

Also, a large space is needed to dispose a ground line between the coupler pair 150 and the coupler pair 151, and the size of the wireless communication modules 110 and 120 increases, which is a demerit.

Figure 4A:
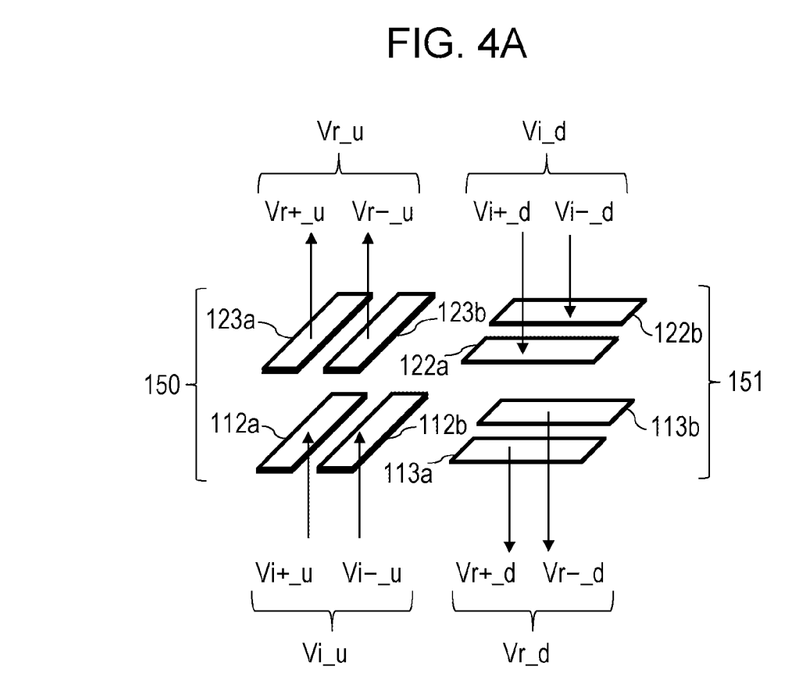
FIG. 4A and FIG. 4B illustrate effects of coupler arrangement.

According to the present embodiment, the coupler arrangement illustrated in FIG. 4A enables the coupler pair 150 and the coupler pair 151 to be arranged to be close to each other and inhibits communication interference from occurring to solve the above problem. Consequently, the size of the wireless communication modules 110 and 120 can be decreased.

Figure 4B:
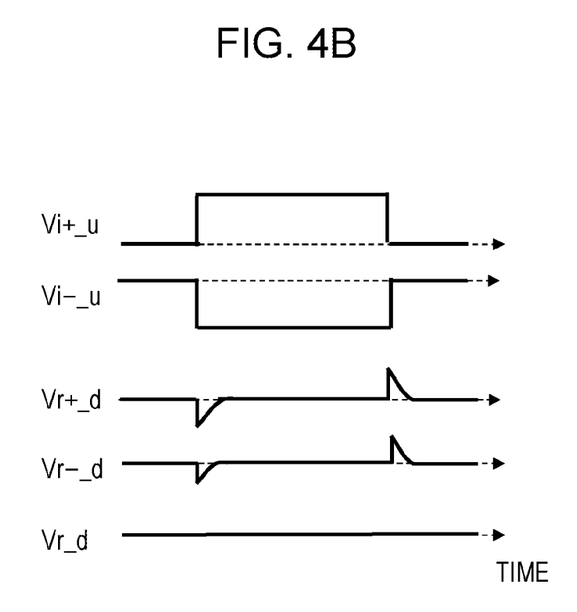

FIG. 4A and FIG. 4B illustrate the effects of the arrangement of the couplers 112a, 112b, 113a, 113b, 122a, 122b, 123a, and 123b according to the present embodiment. FIG. 4A illustrates an example of the arrangement of the couplers 112a, 112b, 113a, 113b, 122a, 122b, 123a, and 123b according to the present embodiment. FIG. 4B illustrates the waveform of a signal in order to describe the effect of the arrangement of the couplers in FIG. 4A to inhibit the communication interference.

The couplers 112a, 112b, 113a, 113b, 122a, 122b, 123a, and 123b are rectangular conductors. The longitudinal directions of the couplers 112a, 112b, 123a, and 123b are parallel to each other. The longitudinal directions of the couplers 113a, 113b, 122a, and 122b are parallel to each other. The longitudinal direction of the coupler pair 150 and the longitudinal direction of the coupler pair 151 are perpendicular to each other. That is, the longitudinal directions of the couplers 112a, 112b, 123a, and 123b are perpendicular to the longitudinal directions of the couplers 113a, 113b, 122a, and 122b. It suffices that the longitudinal directions of the couplers 112a, 112b, 123a, and 123b are substantially perpendicular to the longitudinal directions of the couplers 113a, 113b, 122a, and 122b. The coupler pairs 150 and 151 are arranged to be close to each other.

As illustrated in FIG. 4B, the input signals Vi+_u and Vi−_u are differential signals the level of which changes. In the following description, the level of the input signals Vi+_d and Vi−_d does not change for simplicity of the description.

Since the level of the input signals Vi+_d and Vi−_d does not change, the level of the reception signals Vr+_d and Vr−_d ideally does not change.

However, since the coupler 113a is arranged to be close to the coupler 112b, electric field coupling between the couplers 113a and 112b is dominant Consequently, as illustrated in FIG. 4B, the coupler 113a receives the reception signal Vr+_d that has an edge extending upward and obtained by inexact differential of the input signal Vi−_u of the coupler 112b using electric field coupling to the coupler 112b.

Similarly, since the coupler 113b is arranged to be close to the coupler 112b, electric field coupling between the couplers 113b and 112b is dominant Consequently, as illustrated in FIG. 4B, the coupler 113b receives the reception signal Vr−_d that has an edge extending upward and obtained by inexact differential of the input signal Vi−_u of the coupler 112b using electric field coupling to the coupler 112b.

As illustrated in FIG. 4B, the reception signal Vr_d is a signal of (Vr+_d)-(Vr−_d) and exhibits substantially 0 [V]. In the waveform of the reception signal Vr_d, interference waveform (noise) is inhibited, and a communication error or communication inability can be prevented.

The transformation circuit 114 compares the reception signal Vr_d obtained by subtracting the reception signal Vr−_d from the reception signal Vr+_d and a threshold and outputs the output signals Vo. The transformation circuit 114 can output correct binary signals as the output signals Vo because the reception signal Vr_d is smaller than the threshold. This prevents a communication error.

The couplers 112a, 112b, 113a, and 113b are described above. Also, the couplers 122a, 122b, 123a, and 123b can inhibit the same communication interference. The above arrangement such that the longitudinal direction of the coupler pair 150 and the longitudinal direction of the coupler pair 151 are perpendicular to each other enables the coupler pair 150 and the coupler pair 151 to be arranged to be close to each other and inhibits communication interference from occurring. Consequently, the size of the wireless communication modules 110 and 120 can be decreased.

Figure 5A:
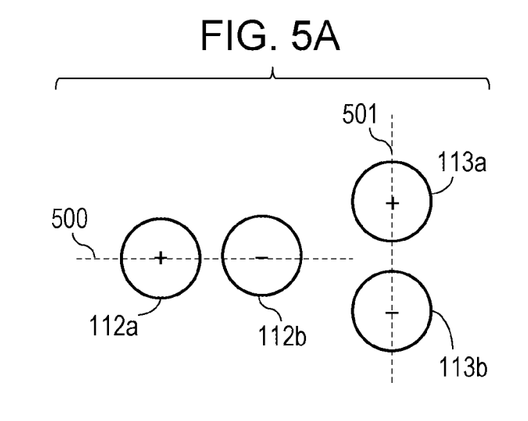
FIG. 5A to FIG. 5E illustrate other coupler structures according to one embodiment.

In FIG. 4A, the couplers 112a, 112b, 113a, 113b, 122a, 122b, 123a, and 123b are rectangular but are not limited thereto. The shape thereof is not limited provided that electric field coupling occurs. For example, as illustrated in FIG. 5A, the shape of the couplers 112a, 112b, 113a, 113b, 122a, 122b, 123a, and 123b may be circular or another shape (a trapezoidal shape or a polygonal shape). The shape and the size of the couplers for transmission may not be the same as those of the couplers for reception. For example, the couplers 112a and 112b may be rectangular, and the couplers 122a and 122b may be circular.

The couplers 112a, 112b, 113a, and 113b in FIG. 5A differ from the couplers 112a, 112b, 113a, and 113b in FIG. 4A only in shape. The shape of the couplers 112a, 112b, 113a, and 113b in FIG. 5A is circular. Similarly, in a case where the shape of the couplers 112a, 112b, 113a, and 113b illustrated in FIG. 4A is circular as illustrated in FIG. 5A, the shape of the couplers 122a, 122b, 123a, and 123b in FIG. 4A is circular.

In FIG. 4A and FIG. 5A, a straight line 500 that connects the centroid of the coupler 112a and the centroid of the coupler 112b to each other is substantially perpendicular to a straight line 501 that connects the centroid of the coupler 113a and the centroid of the coupler 113b to each other. Similarly, a straight line that connects the centroid of the coupler 122a and the centroid of the coupler 122b to each other is substantially perpendicular to a straight line that connects the centroid of the coupler 123a and the centroid of the coupler 123b to each other.

Being substantially perpendicular is not a limitation. It suffices that the straight line 500 that connects the centroid of the coupler 112a and the centroid of the coupler 112b to each other is not parallel to the straight line 501 that connects the centroid of the coupler 113a and the centroid of the coupler 113b to each other. Similarly, it suffices that the straight line that connects the centroid of the coupler 122a and the centroid of the coupler 122b to each other is not parallel to the straight line that connects the centroid of the coupler 123a and the centroid of the coupler 123b to each other.

Figure 5B:
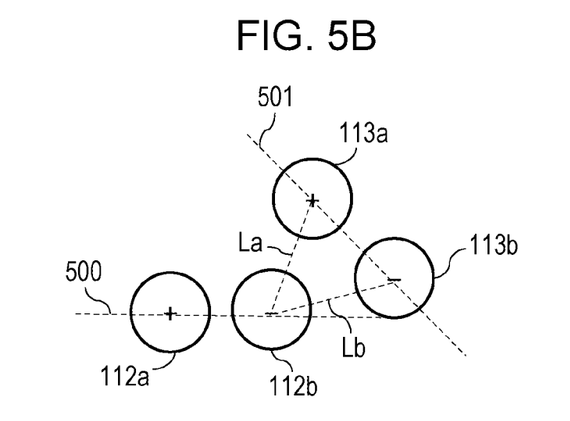

FIG. 5B illustrates another example of an arrangement of the couplers 112a, 112b, 113a, and 113b. The couplers 112a, 112b, 113a, and 113b are circular. Similarly, the couplers 122a, 122b, 123a, and 113b are circular. The straight line 500 that connects the centroid of the coupler 112a and the centroid of the coupler 112b to each other is not parallel to the straight line 501 that connects the centroid of the coupler 113a and the centroid of the coupler 113b to each other. Similarly, the straight line that connects the centroid of the coupler 122a and the centroid of the coupler 122b to each other is not parallel to the straight line that connects the centroid of the coupler 123a and the centroid of the coupler 123b to each other.

In FIG. 5A and FIG. 5B, a distance La between the centroid of the coupler 112b and the centroid of the coupler 113a is substantially equal to a distance Lb between the centroid of the coupler 112b and the centroid of the coupler 113b. Consequently, the degree of electric field coupling between the coupler 112b and the coupler 113a is substantially equal to the degree of electric field coupling between the coupler 112b and the coupler 113b.

Similarly, a distance La between the centroid of the coupler 123b and the centroid of the coupler 122a is substantially equal to a distance Lb between the centroid of the coupler 123b and the centroid of the coupler 122b. Consequently, the degree of electric field coupling between the coupler 123b and the coupler 122a is substantially equal to the degree of electric field coupling between the coupler 123b and the coupler 122b.

In FIG. 5A, a distance between the centroid of the coupler 112a and the centroid of the coupler 113a is substantially equal to a distance between the centroid of the coupler 112a and the centroid of the coupler 113b. Consequently, the degree of electric field coupling between the coupler 112a and the coupler 113a is substantially equal to the degree of electric field coupling between the coupler 112a and the coupler 113b.

Similarly, a distance between the centroid of the coupler 123a and the centroid of the coupler 122a is substantially equal to a distance between the centroid of the coupler 123a and the centroid of the coupler 122b. Consequently, the degree of electric field coupling between the coupler 123a and the coupler 122a is substantially equal to the degree of electric field coupling between the coupler 123a and the coupler 122b.

In an example described herein, La and Lb are substantially equal to each other. This is not a limitation. The effect of inhibiting interference can be achieved provided that a difference between La and Lb is equal to or less than a predetermined value. For example, the difference between La and Lb may be less than the widths of the coupler 113a and the coupler 113b. The same is true for the relationship between the distance between the centroid of the coupler 112a and the centroid of the coupler 113a and the distance between the centroid of the coupler 112a and the centroid of the coupler 113b.

The coupler 113a is closer than the coupler 112a to the coupler 112b. The coupler 113b is closer than the coupler 112a to the coupler 112b.

Similarly, the coupler 122a is closer than the coupler 123a to the coupler 123b. The coupler 122b is closer than the coupler 123a to the coupler 123b.

Figure 5C:
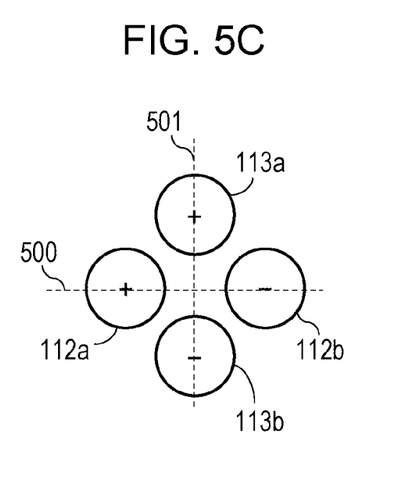

FIG. 5C illustrates another example of the arrangement of the couplers 112a, 112b, 113a, and 113b. The couplers 112a, 112b, 113a, and 113b are circular. Similarly, the couplers 122a, 122b, 123a, and 113b are circular. The straight line 500 that connects the centroid of the coupler 112a and the centroid of the coupler 112b to each other is not parallel to the straight line 501 that connects the centroid of the coupler 113a and the centroid of the coupler 113b to each other. Similarly, the straight line that connects the centroid of the coupler 122a and the centroid of the coupler 122b to each other is not parallel to the straight line that connects the centroid of the coupler 123a and the centroid of the coupler 123b to each other. The straight line 500 is substantially perpendicular to the straight line 501. An intersection point between the straight line 500 and the straight line 501 is located inside a quadrangle that connects the centroid of the coupler 112a, the centroid of the coupler 112b, the centroid of the coupler 113a, and the centroid of the coupler 113b to each other.

In the above description, the couplers 112a and 112b transmit the differential signals, and the couplers 113a and 113b receive the differential signals. However, this is not a limitation. The couplers 112a and 112b may transmit single-ended signals, and the couplers 113a and 113b may receive differential signals. The couplers 112a and 112b may transmit differential signals, and the couplers 113a and 113b may receive single-ended signals.

Figure 5D:
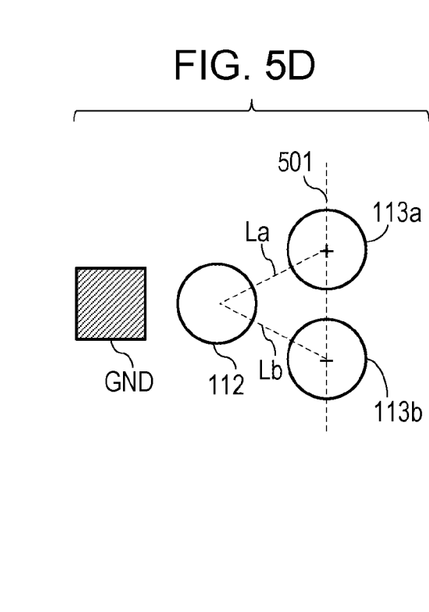
Figure 5E:
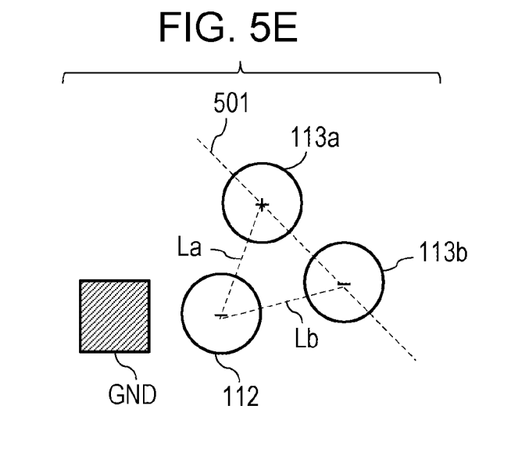

FIG. 5D and FIG. 5E illustrate an example of an arrangement of a coupler 112 and the couplers 113a and 113b. In FIG. 5D, a ground conductor GND and the coupler 112 for communication of single-ended signals are disposed instead of the couplers 112a and 112b for communication of the differential signals in FIG. 5A. In FIG. 5E, the ground conductor GND and the coupler 112 for communication of single-ended signals are disposed instead of the couplers 112a and 112b for communication of the differential signals in FIG. 5B. The couplers 113a and 113b in FIG. 5D and FIG. 5E are the same as those in FIG. 5A and FIG. 5B. The ground conductor GND has a ground electric potential and is close to the coupler 112. The coupler 112 is a conductor that has a reference electric potential for transmission of a single-ended signal. An example of the coupler 112 is a circular conductor and receives a single-ended signal from the transceiver circuit 111.

Similarly, a coupler 123 and a ground conductor GND for communication of single-ended signals are disposed instead of the couplers 123a and 123b for communication of the differential signals. An example of the coupler 123 is a circular conductor and outputs a single-ended signal to the transformation circuit 124.

The coupler 112 wirelessly transmits the single-ended signal to the coupler 123 on the outside therefrom using electric field coupling with the electric potential of the ground conductor GND in the wireless communication module 110 and the electric potential of the ground conductor GND in the wireless communication module 120 used as reference electric potentials. The coupler 123 wirelessly receives the single-ended signal from the coupler 112 on the outside therefrom using electric field coupling with the electric potential of the ground conductor GND in the wireless communication module 120 and the electric potential of the ground conductor GND in the wireless communication module 110 used as reference electric potentials.

The centroid of the coupler 112 is not located on the straight line 501 that connects the centroid of the coupler 113a and the centroid of the coupler 113b to each other. A distance La between the centroid of the coupler 112 and the centroid of the coupler 113a is substantially equal to a distance Lb between the centroid of the coupler 112 and the centroid of the coupler 113b. Consequently, the degree of electric field coupling between the coupler 112 and the coupler 113a is substantially equal to the degree of electric field coupling between the coupler 112 and the coupler 113b. This coupler arrangement enables the coupler pair 150 and the coupler pair 151 to be arranged to be close to each other.

Similarly, the centroid of the coupler 123 is not located on the straight line that connects the centroid of the coupler 122a and the centroid of the coupler 122b. A distance between the centroid of the coupler 123 and the centroid of the coupler 122a is substantially equal to a distance between the centroid of the coupler 123 and the centroid of the coupler 122b. Consequently, the degree of electric field coupling between the coupler 123 and the coupler 122a is substantially equal to the degree of electric field coupling between the coupler 123 and the coupler 122b.

In the example described above, the transformation circuits 114 and 124 shape the reception signals Vr in a differential waveform and outputs the output signals Vo that are binary digital signals that represent "1" or "0" but are not limited thereto. The wireless communication system 100 can be used for any wireless method (such as a method of RF modulation) provided that electric field coupling between the couplers is used.

In the above description, the wireless communication system 100 according to the present embodiment is used for two-way communication in upstream and downstream directions but is not limited thereto. For example, the coupler arrangement described according to the present embodiment can be used for one-way communication in an upstream direction of two lanes (two systems) or in a downstream direction of two lanes by using the coupler pair 150 and the coupler pair 151 for communication in the same direction. The present embodiment is not limited to the communication of the two lanes and can be used as a communication system for two-way communication or one-way communication by performing communication of three or more lanes with three or more coupler pairs.

Figure 6A:
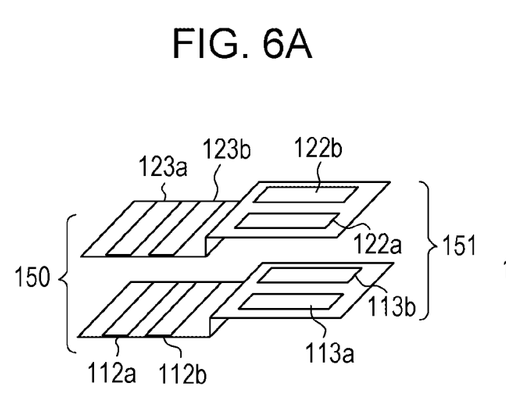
FIG. 6A and FIG. 6B illustrate modifications to the coupler arrangement according to one embodiment.
Figure 6B:
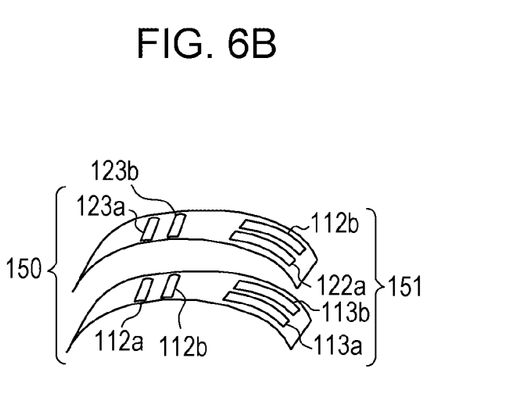

In the description according to the present embodiment, the couplers 112a, 112b, 113a, and 113b and the couplers 122a, 122b, 123a, and 123b are substantially flush with each other but are not limited thereto. For example, the coupler pairs 150 and 151 may be disposed on planes having different heights as illustrated in FIG. 6A or may be disposed on a curved plane as illustrated in FIG. 6B. The arrangement of the coupler pair 150 and the coupler pair 151 that have different heights enables the interference to be further inhibited.

Figure 7A:
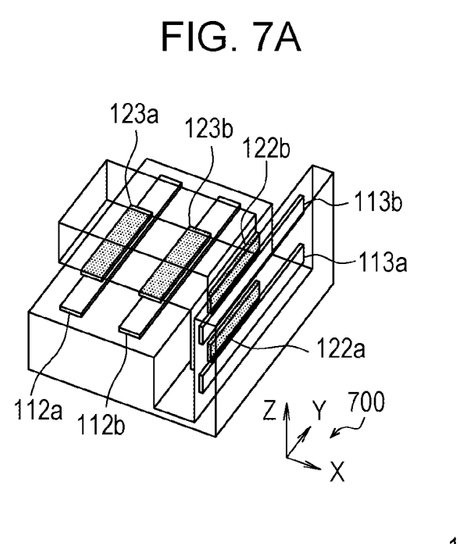
FIG. 7A to FIG. 7C illustrate a three-dimensional coupler arrangement according to one embodiment.
Figure 7B:
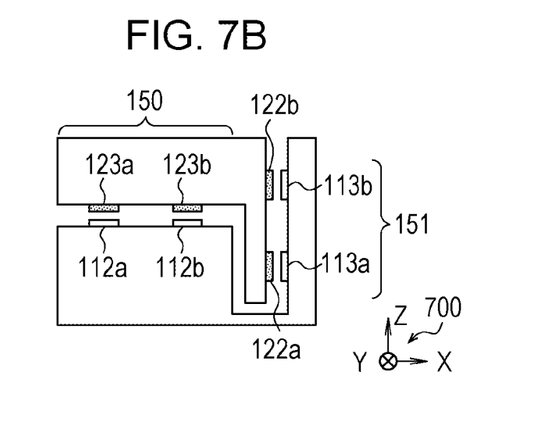
Figure 7C:
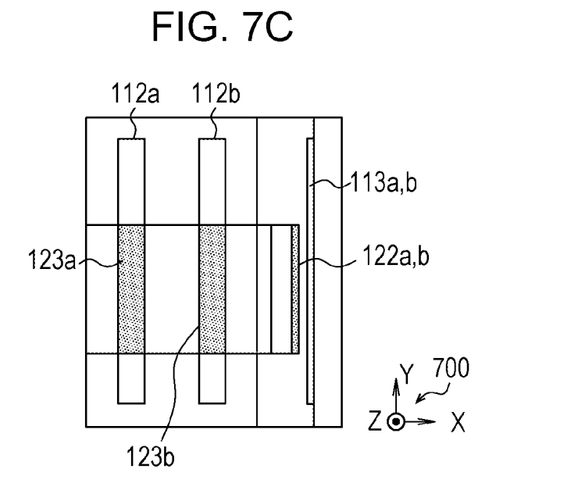

As illustrated in FIG. 7A to FIG. 7C, the coupler pair 150 and the coupler pair 151 may be disposed in a three-dimensional arrangement to achieve orthogonality for inhibiting the interference. FIG. 7A is a perspective view of the couplers 112a, 112b, 113a, 113b, 122a, 122b, 123a, and 113b in an example of three-dimensional arrangement. FIG. 7B is a diagram viewed in the direction of a Y-axis of a coordinate system 700 that is defined by a X-axis, the Y-axis, and a Z-axis that are perpendicular to each other. FIG. 7C is a diagram viewed in the direction of the Z-axis. In this three-dimensional arrangement, an effect of an electromagnetic field from one of the coupler pairs on the other coupler pair is at least partly canceled out, and communication interference can be inhibited.

For example, the lengths of the couplers 112a, 112b, 113a, and 113b (a first coupler set included in the wireless communication module 110) in the direction of the Y-axis are longer than those of the couplers 122a, 122b, 123a, and 123b (a second coupler set included in the wireless communication module 120). The first coupler set, or the second coupler set, or both may be capable of moving in the direction of the Y-axis. With this structure, electric field coupling between the coupler pairs 150 and 151 is maintained, the relative positions of the wireless communication module 110 and the wireless communication module 120 can be changed to predetermined positions, and communication interference between the coupler pairs 150 and 151 can be inhibited. That is, wireless communication between the wireless communication module 110 and the wireless communication module 120 can be performed, and in this state, the wireless communication module 110, or the wireless communication module 120, or both can be moved in a predetermined direction. For example, a driving force of a movement controller by using a motor can be used for movement of the wireless communication modules.

The above embodiment is described by way of example to carry out the present invention. The technical scope of the present invention is not to be interpreted as being limited by the scope of the above embodiment. That is, features of the present disclosure can be carried out by various embodiments without departing from the technical concept or the principal features described in the present disclosure.

According to the above embodiment, communication interference of a communication apparatus that uses electrodes for wireless communication using electric field coupling can be inhibited, and the size thereof can be decreased.

While various embodiments have been described, it is to be understood that the invention is not limited to the disclosed embodiments. The scope of the following claims is to be accorded the broadest interpretation so as to encompass all appropriate modifications and equivalent structures and functions.

This application claims the benefit of Japanese Patent Application No. 2019-077096, filed Apr. 15, 2019, which is hereby incorporated by reference herein in its entirety.

What is claimed is:

1. A wireless communication apparatus comprising:
   a first conductor and a second conductor that function as a set of electrodes for wireless communication of a differential signal using electric field coupling, between the wireless communication apparatus and another wireless communication apparatus; and
   a third conductor and a fourth conductor that function as another set of electrodes for wireless communication using electric field coupling, between the wireless communication apparatus and the another wireless communication apparatus,
   wherein a difference between a first distance between a centroid of the first conductor and a centroid of the third conductor and a second distance between a centroid of the second conductor and the centroid of the third conductor is less than a width of the first conductor and a width of the second conductor,
   wherein a third distance between the centroid of the first conductor and a centroid of the fourth conductor is longer than the first distance, and
   wherein a fourth distance between the centroid of the second conductor and the centroid of the fourth conductor is longer than the second distance.

2. The wireless communication apparatus according to claim 1,
   wherein the first conductor, the second conductor, the third conductor, and the fourth conductor are disposed on the same substrate.

3. The wireless communication apparatus according to claim 1,
   wherein a difference between the third distance between the centroid of the first conductor and the centroid of the fourth conductor, and the fourth distance between the centroid of the second conductor and the centroid of the fourth conductor is less than the width of the first conductor and the width of the second conductor.

4. The wireless communication apparatus according to claim 3,
   wherein the first distance and the second distance are substantially equal to each other, and
   wherein the third distance and the fourth distance are substantially equal to each other.

5. The wireless communication apparatus according to claim 1,
   wherein a degree of coupling between the first conductor and the third conductor and a degree of coupling between the second conductor and the third conductor are substantially equal to each other.

6. The wireless communication apparatus according to claim 5,
   wherein a degree of coupling between the first conductor and the fourth conductor and a degree of coupling between the second conductor and the fourth conductor are substantially equal to each other.

7. The wireless communication apparatus according to claim 1, wherein a first straight line that passes through the centroid of the first conductor and the centroid of the second conductor is substantially perpendicular to a second straight line that passes through the centroid of the third conductor and the centroid of the fourth conductor.

8. The wireless communication apparatus according to claim 7,
wherein the second straight line passes between the centroid of the first conductor and the centroid of the second conductor.

9. The wireless communication apparatus according to claim 1,
wherein the first conductor and the second conductor are used for performing wireless communication of a first differential signal, and
wherein the third conductor and the fourth conductor are used for performing wireless communication of a second differential signal.

10. The wireless communication apparatus according to claim 1,
wherein the first conductor and the second conductor are used for performing wireless communication of a differential signal, and
wherein the third conductor is used for performing wireless communication of a single-ended signal where an electric potential of the fourth conductor is used as a reference electric potential.

11. The wireless communication apparatus according to claim 1,
wherein the first conductor and the second conductor are used by the wireless communication apparatus for wirelessly receiving a signal from the another wireless communication apparatus using electric field coupling, and
wherein the third conductor and the fourth conductor are used by the wireless communication apparatus for wirelessly transmitting a signal to the another wireless communication apparatus using electric field coupling.

12. The wireless communication apparatus according to claim 1,
wherein the first conductor and the second conductor are used by the wireless communication apparatus for wirelessly transmitting a signal to the another wireless communication apparatus using electric field coupling, and
wherein the third conductor and the fourth conductor are used by the wireless communication apparatus for wirelessly transmitting a signal to the another wireless communication apparatus using electric field coupling.

13. A wireless communication system comprising:
a first wireless communication apparatus that includes a first conductor, a second conductor, a third conductor, and a fourth conductor; and
a second wireless communication apparatus that includes a fifth conductor, a sixth conductor, a seventh conductor, and an eighth conductor,
wherein the first conductor and the fifth conductor face each other,
wherein the second conductor and the sixth conductor face each other,
wherein the third conductor and the seventh conductor face each other,
wherein the fourth conductor and the eighth conductor face each other,
wherein the first conductor and the second conductor function as a set of electrodes for performing wireless communication of a differential signal using electric field coupling, between the wireless communication apparatus and another wireless communication apparatus,
wherein the third conductor and the fourth conductor function as another set of electrodes for performing wireless communication using electric field coupling, between the wireless communication apparatus and the another wireless communication apparatus,
wherein a difference between a first distance between a centroid of the first conductor and a centroid of the third conductor and a second distance between a centroid of the second conductor and the centroid of the third conductor is less than a width of the first conductor and a width of the second conductor,
wherein a third distance between the centroid of the first conductor and a centroid of the fourth conductor is longer than the first distance, and
wherein a fourth distance between the centroid of the second conductor and the centroid of the fourth conductor is longer than the second distance.

14. A communication method implemented using a wireless communication apparatus that includes a first conductor, a second conductor, a third conductor, and a fourth conductor, the communication method comprising:
performing, using the first conductor and the second conductor as a set of electrodes, wireless communication of a differential signal using electric field coupling, between the wireless communication apparatus and another wireless communication apparatus; and
performing, using the third conductor and the fourth conductor as another set of electrodes, wireless communication of a differential signal using electric field coupling, between the wireless communication apparatus and the another wireless communication apparatus,
wherein a difference between a first distance between a centroid of the first conductor and a centroid of the third conductor and a second distance between a centroid of the second conductor and the centroid of the third conductor is less than a width of the first conductor and a width of the second conductor, and
wherein a third distance between the centroid of the first conductor and a centroid of the fourth conductor is longer than the first distance, and
wherein a fourth distance between the centroid of the second conductor and the centroid of the fourth conductor is longer than the second distance.

15. The communication method according to claim 14,
wherein the wireless communication performed by using the first conductor and the second conductor is wireless communication of a first differential signal, and
wherein the wireless communication performed by using the third conductor and the fourth conductor is wireless communication of a second differential signal.

16. The communication method according to claim 14,
wherein the wireless communication performed by using the first conductor and the second conductor is communication of the wireless communication apparatus that wirelessly receives a signal from the another wireless communication apparatus using electric field coupling, and
wherein the wireless communication performed by using the third conductor and the fourth conductor is communication of the wireless communication apparatus that wirelessly transmits a signal to the another wireless communication apparatus using electric field coupling.

* * * * *